United States Patent
Ren et al.

(10) Patent No.: US 12,461,086 B1
(45) Date of Patent: Nov. 4, 2025

(54) METHOD FOR DELINEATING ORE BODY OF DEEP-SEA POLYMETALLIC NODULES BASED ON COVERAGE DATA

(71) Applicant: The First Institute of Oceanography, MNR, Qingdao (CN)

(72) Inventors: Xiangwen Ren, Qingdao (CN); Shijuan Yan, Qingdao (CN); Yuxue Zhang, Qingdao (CN); Yue Hao, Qingdao (CN); Yiping Luo, Qingdao (CN); Dalong Liu, Qingdao (CN)

(73) Assignee: The First Institute of Oceanography, MNR, Qingdao (CN)

( * ) Notice: Subject to any disclaimer, the term of this patent is extended or adjusted under 35 U.S.C. 154(b) by 0 days.

(21) Appl. No.: 19/080,811

(22) Filed: Mar. 15, 2025

(30) Foreign Application Priority Data

Jul. 24, 2024 (CN) .......................... 202410993819.6

(51) Int. Cl.
   G01N 33/24 (2006.01)
   G06Q 50/02 (2024.01)

(52) U.S. Cl.
   CPC ............. *G01N 33/24* (2013.01); *G06Q 50/02* (2013.01)

(58) Field of Classification Search
   CPC ............................... G01N 33/24; G06Q 50/02
   See application file for complete search history.

(56) References Cited

U.S. PATENT DOCUMENTS

2020/0165795 A1* 5/2020 Chang .................... E21C 50/00

FOREIGN PATENT DOCUMENTS

CN 113448338 A * 9/2021 ........... G05D 1/0692

OTHER PUBLICATIONS

Lenoble "Polymetallic Nodules Resources and Reserves in the North Pacific from the Data Collected by AFERNOD" , Ocean Management, pp. 9-24 (Year: 1980).*
"Delineation of Mine-Sites and potential in Different Sea Areas", vol. 4; Graham& Trotman Limited; Managanese Nodule Resources Nature, Distribution and Extent, Seabed Minerals Series (Year: 1987).*

(Continued)

*Primary Examiner* — Michael J Dalbo
*Assistant Examiner* — Kaleria Knox
(74) *Attorney, Agent, or Firm* — Hemisphere Law, PLLC; Zhigang Ma (57) ABSTRACT

A method for delineating an ore body of deep-sea polymetallic nodules based on coverage data includes steps as follows. Ore body data of the deep-sea polymetallic nodules is obtained, the ore body data includes: mining site production scale parameters, mining system parameters, and ore body geological characteristic parameters. A boundary coverage rate and a cumulative weighted average coverage rate are calculated based on the mining site production scale parameters, the mining system parameters, and the ore body geological characteristic parameters. The ore body is delineated, based on the boundary coverage and the cumulative weighted average coverage, through a principle of ore body boundary range delineation to obtain an ore body range. The method delineates ore body of nodule with proper geological continuity based on abundance data. It can be directly applied to deep-sea polymetallic nodule mining, solving the problems existing in the delineation of ore body of deep-sea polymetallic nodule.

7 Claims, 4 Drawing Sheets

(56) References Cited

OTHER PUBLICATIONS

Bazaluk "Determining the Safe Distance for Mining Equipment Operation When Forming an Internal Dump in a Deep Open Pit", Article, pp. 2-18; https//:www.mdpi.com/journal/sustainability (Year: 2023).*

AMC Consultants Pty Ltd for Deep Green Metals Ins., Initial Assessment of the NORI Property, Clarion-Clipperton Zone, Technical Report Summary, Mar. 17, 2021, all pages.

Graham & Trotman Limited, Delineation of Mine-Sites and Potential in Different Sea Areas, Manganese Nodule Resources Nature, Distribution and Extent, Seabed Minerals Series, 1987, all pages, vol. 4.

AMC Consultants Pty Ltd for Deep Green Metals Ins., TOML Clarion Clipperton Zone Project, Pacific Ocean, NI 43-101 Technical Report, Mar. 30, 2016, all pages.

China Association of Oceanic Engineering, Technical guidelines for resource estimation of deep-sea polymetallic nodules, the Group Standard, Mar. 29, 2023, all pages.

Li Bo et al., Technical guidelines for seafloor polymetallic nodules mining system, Social Organization Standard, Jul. 7, 2021, all pages.

J.-P. Lenoble, Polymetallic Nodules Resources and Reserves in the North Pacific from the Data Collected by AFERNOD, Ocean Management, Jun. 1981, vol. 7, Issues 1-4, pp. 9-24.

CNIPA, Notification of a First Office Action for CN202410993819.6, Aug. 29, 2024.

The First Institute of Oceanography, MNR (Applicant), Replacement claims (allowed) of CN202410993819.6, Sep. 12, 2024.

CNIPA, Notification to grant patent right for invention in CN202410993819.6, Sep. 25, 2024.

* cited by examiner

METHOD FOR DELINEATING ORE BODY OF DEEP-SEA POLYMETALLIC NODULES BASED ON COVERAGE DATA

CROSS-REFERENCE TO RELATED APPLICATION

This application claims priority to Chinese patent application No. CN202410993819.6, filed to China National Intellectual Property Administration (CNIPA) on Jul. 24, 2024, which is herein incorporated by reference in its entirety.

TECHNICAL FIELD

The disclosure relates to the technical field of exploration and evaluation of underwater mineral resources, and particularly to a method for delineating ore body of deep-sea polymetallic nodules based on coverage data.

BACKGROUND

Currently, methods for delineating boundaries of ore body of deep-sea polymetallic nodule using abundance are not sufficient to support an exploitation of polymetallic nodules. The water depth of the occurrence of deep-sea polymetallic nodules is in a specific range of 4000 meters-6000 meters. Regulations and standards for an exploration of polymetallic nodule deposits in the ocean have proposed indicators such as abundance for the estimation of polymetallic nodule mining areas, but have not clearly defined the technology for delineating ore bodies using the abundance indicators.

Polymetallic nodules are a type of solid mineral resource that occurs on the ocean floor of deep-sea basin. This special geological occurrence of the deep-sea polymetallic nodules allows for conversion of coverage data into abundance data for resource estimation. The polymetallic nodules mainly occur on the surface of deep-sea sediments. Through photography or videography equipment carried by towed camera sled or unmanned underwater vehicles (AUVs), photographic data of polymetallic nodules on the ocean floor can be obtained. Then, through computer image processing techniques such as deep convolutional neural networks, the polymetallic nodules and the sediments can be identified, and further, a coverage of polymetallic nodules (a percentage of the area occupied by nodules in a specific area of the sea floor) can be calculated. In addition, abundance of polymetallic nodules can be obtained by box corer. Through statistical analysis methods such as multiple linear correlation analysis, a correlation between the coverage and abundance of polymetallic nodules can be established. Based on this, the photographic data of polymetallic nodules and the coverage and abundance data obtained therefrom can be used as data for estimation of polymetallic nodule resources (Li Bo, Zhang Weiyang, Zhu Kechao, Wang Yang, He Gaowen, Li Haiming, Jiang Xunxiong, Ren Xiangwen, Pang Yuntian, Wang Hongyi, Han Luwei, Du Liang. Technical Guidelines for the Estimation of Polymetallic Nodule Resources in the Ocean. T/CAOE 47-2023).

Considering requirements of polymetallic nodule mine construction and production tasks, technical indicators of a mining system, and geological characteristics of polymetallic nodule deposits, a technology for delineating ore body of nodule with proper geological continuity has not yet been well developed. Basic distribution characteristics of the polymetallic nodules on the deep-sea floor are discontinuous, with areas of polymetallic nodule distribution and blank areas without nodules interspersed, similar to a lace skirt with holes (Lenoble J P. Polymetallic nodules resources and reserves in the North Pacific from the data collected by AFERNOD. Ocean Management, 1981, 7:9-24). Under certain production scales, mining system production capacities (such as: 3 million tons per year, United Nations Ocean Economics and Technology Branch. 1987. Seabed Minerals Series Volume 4: Delineation of mine-sites and potential in different sea areas. London: Graham & Trotman Limited. P21), and a premise of ensuring the geological continuity of the ore body, how to delineate the ore body that complies the boundary coverage of polymetallic nodules is an important technical problem faced by exploitation of deep-sea polymetallic nodules.

SUMMARY

The disclosure provides a method for delineating an ore body of deep-sea polymetallic nodules based on coverage data to solve the problems in the related art.

To achieve above purpose, the technical solutions of the disclosure are as follows.

A method for delineating an ore body of deep-sea polymetallic nodules based on coverage data includes steps as follows:

obtaining ore body data of the deep-sea polymetallic nodules, wherein the ore body data includes: mining site production scale parameters, mining system parameters, and ore body geological characteristic parameters;

calculating, based on the mining site production scale parameters, the mining system parameters, and the ore body geological characteristic parameters, a boundary coverage rate and a cumulative weighted average coverage rate; and delineating, based on the boundary coverage and the cumulative weighted average coverage, the ore body of the deep-sea polymetallic nodules through a principle of ore body boundary range delineation to obtain an ore body range.

In an embodiment, the mining site production scale parameters include: an annual production of dry nodules, a water content of nodules, and production days per year.

In an embodiment, the mining system parameters include: a quantity of mining machines, a collection head width of each of the mining machines, a collection surface overlap, a width of collection operation surface of each of the mining machines, a daily operation distance of each of the mining machines, a recovery rate, a first travel speed of each of the mining machines during collection operation, a first total distance, a first duration, a second travel speed of each of the mining machines during no-load operation, a second total distance, and a second duration.

In an embodiment, the ore body geological characteristic parameters include: longitudes and latitudes of camera coverage data points, a spacing of adjacent two of the camera coverage data points, a measured coverage, a proportion of mineable area of the ore body, a coverage of mining blank area, a prediction average abundance, and a water content of nodule.

In an embodiment, a formula of the boundary coverage rate is expressed as follows:

$$\overline{C} = 2.9853 \cdot \frac{(V1 - V1 \cdot r + V2 \cdot r)}{24 \cdot V1 \cdot V2 \cdot r \cdot W' \cdot ol \cdot N \cdot R} \cdot \frac{T'}{(1-h) \cdot D}$$

where $$r = \frac{L_1}{L}, L_1 = \sum_{i=1}^{i=n} l_i, l_i = (l_{i-1} + l_{i+1})/2;$$

$l_i$ represents the spacing of adjacent two of the camera coverage data points; L represents the daily operation distance of each of the mining machines; $L_1$ represents the first total distance; V1 represents the first travel speed; V2 represents the second travel speed; r represents the proportion of the mineable area of the ore body; W' represents the width of the collection head of each of the mining machines; ol represents the overlap of a collection surface; N represents number of mining machines; R represents the recovery rate; T' represents the annual production of dry nodules; h represents the water content of nodules; and D represents the production days per year.

In an embodiment, a formula of the cumulative weighted average coverage is expressed as follows:
the cumulative weighted average coverage rate C being calculated from $C_1, C_2, \ldots, C_n$, $$C_n = \frac{\sum_{i=1}^{n} l_i Cov_i}{\sum_{i=1}^{n} l_i}, \text{ and } Cov_i \geq C_0$$

where $l_i$ represents the spacing of adjacent two of the camera coverage data points; $Cov_i$ represents the measured coverage rate; $C_0$ represents a lower limit of mineable coverage rate of mining system.

In an embodiment, the principle of ore body boundary range delineation includes: a principle of single-ore body delineation and a principle of multi-ore body delineation.

In an embodiment, the method further includes:
setting a starting point, and
comparing, based on the starting point, the boundary coverage rate with the cumulative weighted average coverage rate through the principle of single-ore body delineation to obtain comparison results, and determining the ore body range based on the comparison results.

In an embodiment, the determining the ore body range based on the comparison results includes:
in response to $M1 \leq X < M2$, $C < \overline{C}$, namely, the cumulative weighted average coverage rate being lower than the boundary coverage rate, thus an annual yield of ore body being lower than expected, determining there is no ore body;
in response to $M1 \leq X < M2$, $C = \overline{C}$, namely, the cumulative weighted average coverage rate being equal to the boundary coverage rate, thus the annual yield of ore body being equal to expected, determining there is an ore body;
in response to $M1 \leq X < M3$, $C > \overline{C}$, namely, the cumulative weighted average coverage rate being higher than the boundary coverage rate, thus the annual yield of ore body being higher than expected, determining there is an ore body;
in response to $M1 \leq X < M3$, $C = \overline{C}$, namely, the cumulative weighted average coverage rate being equal to the boundary coverage rate, thus the annual yield of ore body being equal to expected, determining there is an ore body;
in response to $M1 \leq X \leq M4$, $C < \overline{C}$, namely, the cumulative weighted average coverage rate being lower than the boundary coverage rate, thus the annual yield of ore body being lower than expected, determining there is no ore body;
delineating, based on the comparison results, the range of $M1 \leq X \leq M3$ as a first ore body.

In an embodiment, the method further includes: planning an annual production of a nodule mine, constructing a mining system, based on the ore body range by delineating the ore body on ocean floor, and using the mining machines, through the mining system, to collect nodules on the deep-sea floor, thereby yielding production of nodules complying the planned annual production of the nodule mine.

In an embodiment, based on the principle of multi-ore body delineation, a step length is added on an endpoint of a single-ore body range as a starting point, and the calculating and the determining are continued. In response to no ore body being identified, the step length is continued adding with, and followed by continuing the calculating and the determining, until a range of a second ore body is identified.

A non-transitory computer-readable storage medium stored with computer program instructions is also provided, the computer program instructions are configured, when being executed by a processor, to implement the method mentioned above.

The disclosure provides a method for delineating an ore body of deep-sea polymetallic nodules based on coverage data, considering requirements of three aspects: the mining site production scale parameters, the mining system parameters, and the ore body geological characteristic parameters. It establishes a quantitative relationship among these three aspects, providing a technical path for the selection and improvement direction of technical parameters in mine construction design and mining system design. The disclosure can delineate the ore body of nodule with proper geological continuity based on the abundance data, and can be directly applied to deep-sea polymetallic nodule mining, solving the problems existing in the delineation of ore body of deep-sea polymetallic nodule.

BRIEF DESCRIPTION OF DRAWINGS

The attached drawings, which form a part of the disclosure, are provided to further understand the disclosure. The illustrative embodiments and their descriptions of the disclosure are used to explain the disclosure and do not constitute an undue limitation on the disclosure.

DETAILED DESCRIPTION OF EMBODIMENTS

It should be noted that, under the condition of no conflict, the embodiments and the features in the embodiments of the disclosure can be combined with each other. The following will refer to the attached drawings and combine the embodiments to explain the disclosure in detail.

It should be noted that the steps shown in the flowcharts of the attached drawings can be executed in a computer system, such as a set of computer-executable instructions.

Moreover, although a logical order is shown in the flowcharts, the steps shown or described can be executed in a different order than shown here in some cases.

Embodiment 1

Figure 1:
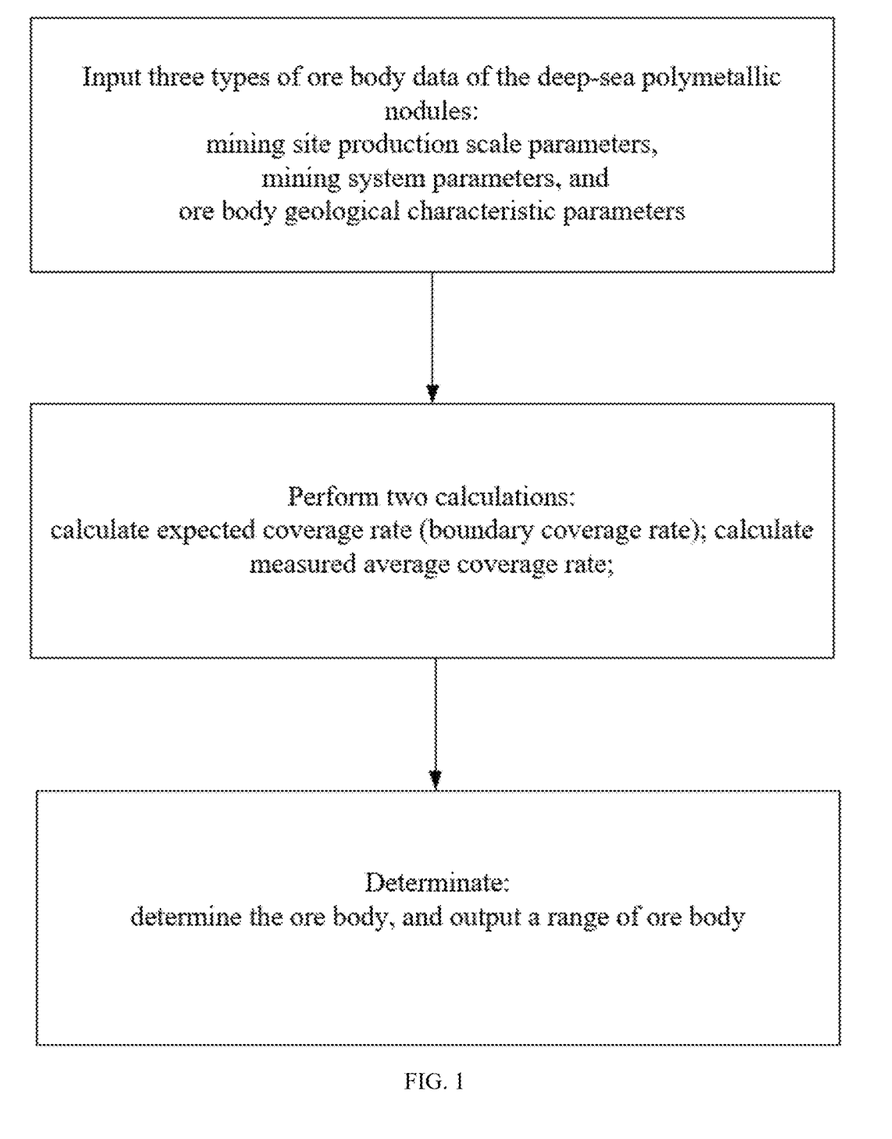
FIG. 1 illustrates a flowchart of a method in an embodiment of the disclosure.

As shown in FIG. 1, the method for delineating an ore body of deep-sea polymetallic nodules based on coverage data includes steps as follows.

S1, ore body data of the deep-sea polymetallic nodules is obtained, and the ore body data includes: mining site production scale parameters, mining system parameters, and ore body geological characteristic parameters.

TABLE 1

| Mining site production scale parameters | | | | |
|---|---|---|---|---|
| Serial Number | Variables | Symbol | Value | Formula and Explanation |
| 1 | Annual production of dry nodules | T' | 3 million tons per year | Production scale: 3 million tons per year. ore body Reference: United Nations Ocean Economics and Technology Branch. 1987. Seabed Minerals Series Volume 4: Delineation of mine-sites and potential in different sea areas. London: Graham & Trotman Limited. P21. |

TABLE 1-continued

| Mining site production scale parameters | | | | |
|---|---|---|---|---|
| Serial Number | Variables | Symbol | Value | Formula and Explanation |
| 2 | Water content of nodules | T | 133300 tons per day | $T = 300/[(1 - w) \times 300]$ Ten thousand tons. Water content of nodule: h, the average water content of nodules in the western Pacific (West Pacific) is 25.3%. $T = L1 \cdot W \cdot N \cdot R \cdot \overline{A}$ |
| 3 | Production days per year | D | 300 days | Considering risks of extreme weather conditions and equipment maintenance, annual production days is selected to be 300 days. |

The mining system parameters includes 12 parameters as shown in Table 2: a quantity of mining machines, a collection head width of each of the mining machines, a collection surface overlap, a width of collection operation surface of each of the mining machines, a daily operation distance of each of the mining machines, a recovery rate, a first travel speed of each of the mining machines during collection operation, a first total distance, a first duration, a second travel speed of each of the mining machines during no-load operation, a second total distance, and a second duration.

TABLE 2

| Mining system parameters | | | | |
|---|---|---|---|---|
| Serial Number | Variables | Symbol | Value | Formula and Explanation |
| 1 | Quantity of mining machines | N | 1 | N is a positive integer |
| 2 | Collection head width of each of the mining machines | W' | 6 m | An estimated the collection head width of a 6 m. TMC mining machine (a 20% scale prototype) is 6 meters. Reference: AMC, 2021. Initial Assessment of the NORI Property, Clarion Clipperton Zone, Technical Report Summary compiled under NI-43-101 by AMC Consultants Pty Ltd for Deep Green Metals Inc. |
| 3 | Collection surface overlap | ol | 10% | <10%. Reference: Technical guidelines for seafloor polymetallic nodules mining system T/CAOE 40-2021 |
| 4 | Width of collection operation surface of each of the mining machines | W | 5.4 m | $W = W' \cdot ol$ |
| 5 | Daily operation distance of each of the mining machines | L | | Unit: km, based on the cumulative statistics of video data. |
| 6 | Recovery rate | R | 85.5% | >85%. Reference: Technical guidelines for seafloor polymetallic nodule mining systems T/CAOE 40-2021 |

TABLE 2-continued

Mining system parameters

| Serial Number | Variables | | Symbol | Value | Formula and Explanation |
|---|---|---|---|---|---|
| 7 | Daily operation of each of mining machines | Travel speed | V1 | 9 km/h | Estimate mining machine of 9 km/h. TMC (a 20% scale prototype). 0.5 m/s = 1.8 km/h, 1.8 km/h × 5 = 9 km/h Reference: AMC, 2021. Initial Assessment of the NORI Property, Clarion Clipperton Zone, Technical Report Summary compiled under NI-43-101 by AMC Consultants Pty Ltd for Deep Green Metals Inc |
| 8 | | Total distance | L1 | / | According to the statistical data of video, when Ci >= 5%, $L_1 = \sum_{i=1}^{i=n} l_i$ · Unit: km. $L1 = \dfrac{24 \cdot V1 \cdot V2 \cdot r}{V1 - V1 \cdot r + V2 \cdot r}$ |
| 9 | | Duration | t1 | / | t1 = L1/V1; t1 + t2 = 24 h |
| 10 | Daily cruising of each of mining machines | Travel speed | V2 | 9 km/h | Estimate mining machine of 9 km/h. TMC (a 20% scale prototype). 0.5 m/s = 1.8 km/h, 1.8 km/h × 5 = 9 km/h Reference: AMC, 2021. Initial Assessment of the NORI Property, Clarion Clipperton Zone, Technical Report Summary compiled under NI-43-101 by AMC Consultants Pty Ltd for Deep Green Metals Inc |
| 11 | | Total distance | L2 | / | According to the statistical data of video, when Ci < 5%, $L_2 = \sum_{i=1}^{i=n} l_i$ · Unit: km. |
| 12 | | Duration | t2 | / | t2 = L2/V2; t1 + t2 = 24 h |

The ore body geological characteristic parameters include 9 parameters as shown in table 3: longitudes and latitudes of camera coverage data points, a spacing of adjacent two of the camera coverage data points, a measured coverage, a proportion of mineable area of the ore body, the boundary coverage rate and the cumulative weighted average coverage rate, a coverage of mining blank area, a prediction average abundance, and a water content of nodule.

TABLE 3 ore body geological characteristic parameters

| Serial Number | Variables | Symbol | Value | Formula and Explanation |
|---|---|---|---|---|
| 1 | longitudes and latitudes of camera coverage data points | $lon_i$, $lat_i$ | / | Camera data latitude and longitude coordinates. The distance between adjacent two camera coverage data points is calculated by the Spherical projection formula. |
| 2 | spacing of adjacent two of the camera coverage data points | $l_i$ | / | It is half of a distance between two adjacent camera coverage data points. li = $(l_{i-1} + l_{i+1})/2$ |

TABLE 3-continued ore body geological characteristic parameters

| Serial Number | Variables | Symbol | Value | Formula and Explanation |
|---|---|---|---|---|
| 3 | measured coverage | $Cov_i$ | / | Coverage rate data actually measured by camera, photography and other equipment. |
| 4 | Proportion of mineable area of the ore body (Characterizing geological continuity) | r | / | $r = L_1/L$, Unit: km, according to statistical camera coverage data points. |
| 5 | Boundary coverage rate (minable area, desired cut-off coverage) | $\overline{C}$ | / | $\overline{C} = f(\overline{A}) = f\left(\dfrac{T}{L1 \cdot W \cdot N \cdot R}\right) = 2.9853 \times \dfrac{T(V1 - V1 \cdot r + V2 \cdot r)}{24 \cdot V1 \cdot V2 \cdot r \cdot W \cdot N \cdot R}$ <br> $\overline{C} = 2.9853\overline{A}$ <br> Reference: Lipton I T, Nimmo M J, Parianos J M. NI 43-101 Technical report. TOML Clarion Clipperton Zone project, Pacific Ocean. Nautilus Minerals. |
| 6 | Cumulative weighted average coverage rate (mineable area, coverage rate ≥ $C_0$) | $\overline{C}$ | / | Continuous cumulative weighted average, with weights being $l_i$ <br> $// C_n = \dfrac{\sum_{i=1}^{n} l_i Cov_i}{\sum_{i=1}^{n} l_i}, Cov_i >= C_0,$ <br> namely, camera coverage data points that do not include coverage rate $C_0$. |
| 7 | Coverage of mining blank area | $C_0$ | 5% | Taking 5% as example |
| 8 | Prediction average abundance (mineable area, desired cut-off abundance) | $\overline{A}$ | / | $\overline{A} = \dfrac{T}{L1 \cdot W \cdot N \cdot R}$ <br> Unit: kg/m² |
| 9 | Water content of nodule | h | 25.3% | Average water content of nodules in the western Pacific is 25.3%. |

Note: "/" indicates that data or parameter is obtained from exploration data or calculated by a formula.

S2: a formula of the boundary coverage rate is expressed as follows:

It is known that, $T = L1 \cdot W \cdot N \cdot R \cdot \overline{A}$, so, $$\overline{A} = \dfrac{T}{L1 \cdot W \cdot N \cdot R},$$

also, since $\overline{C} = f(\overline{A})$ (for example, $\overline{C} = 2.9853\overline{A}$), therefore, $$\overline{C} = f(\overline{A}) = f\left(\dfrac{T}{L1 \cdot W \cdot N \cdot R}\right),$$

where $L1 = \dfrac{24 \cdot V1 \cdot V2 \cdot r}{V1 - V1 \cdot r + V2 \cdot r}$, $W = W' \times ol$, so $\overline{C} = 2.9853 \cdot \dfrac{T(V1 - V1 \cdot r + V2 \cdot r)}{24 \cdot V1 \cdot V2 \cdot r \cdot W' \cdot ol \cdot N \cdot R}$, since, $T = \dfrac{T'}{(1-h) \cdot D}$, therefore, $\overline{C} = 2.9853 \cdot \dfrac{(V1 - V1 \cdot r + V2 \cdot r)}{24 \cdot V1 \cdot V2 \cdot r \cdot W' \cdot ol \cdot N \cdot R} \cdot \dfrac{T'}{(1-h) \cdot D}$ where $r = \dfrac{L_1}{L}$, $L_1 = \sum_{i=1}^{i=n} l_i$, $l_i = (l_{i-1} + l_{i+1})/2$;

$l_i$ represents the spacing of adjacent two of the camera coverage data points; L represents the daily operation distance of each of the mining machines; $L_1$ represents the first total distance; V1 represents the first travel speed; V2 represents the second travel speed; r represents the proportion of the mineable area of the ore body; W' represents the width of the collection head of each of the mining machines; ol represents the collection surface overlap; N represents number of mining machines; R represents the recovery rate; T' represents the annual production of dry nodules; h represents the water content of nodules; and D represents the production days per year.

A formula of the cumulative weighted average coverage is expressed as follows:

the cumulative weighted average coverage rate C being calculated from $C_1, C_2, \ldots, C_n$, $$C_n = \frac{\sum_{i=1}^{n} l_i Cov_i}{\sum_{i=1}^{n} l_i}, \text{ and } Cov_i \geq C_0$$

where $l_i$ represents the spacing of adjacent two of the camera coverage data points; $Cov_i$ represents the measured coverage rate; $C_0$ represents a lower limit of mineable coverage rate of mining system. In the embodiment, the coverage of mining blank area is taken as 5%.

S3, the boundary coverage rate is compared with the cumulative weighted average coverage rate, based on the starting point, through the principle of single-ore body delineation to obtain comparison results, and the ore body range is determined based on the comparison results.

Figure 2:
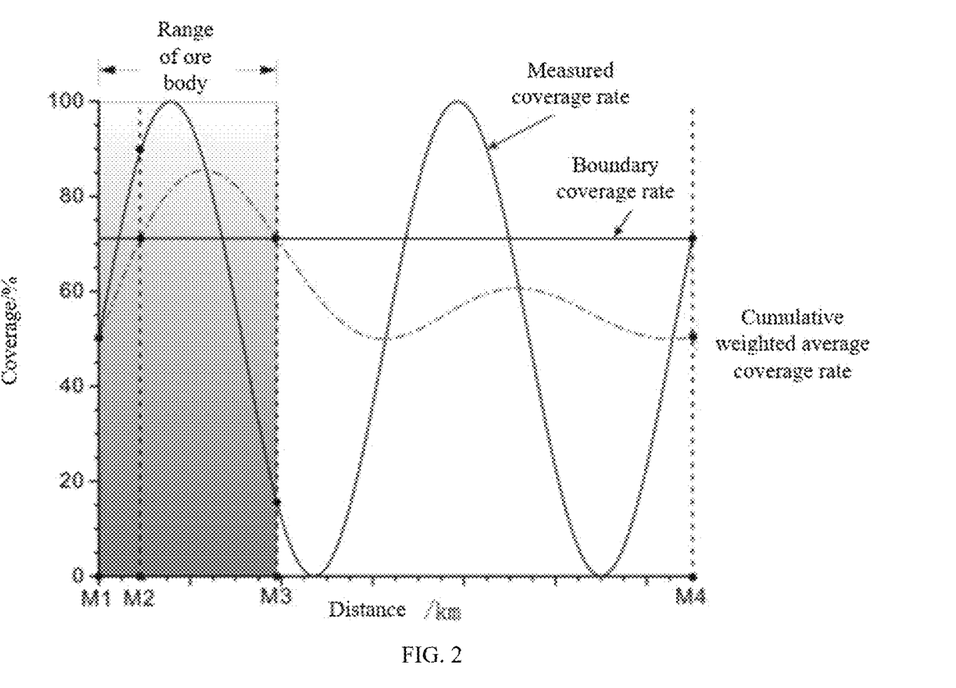
FIG. 2 illustrates a schematic diagram of a principle of single-ore body delineation in the disclosure.

Specifically, the principle of delineating the boundary range of a first ore body is as follows:

M (M1, M2, ..., Mn) represents a search start and end point, and X represents a search distance. The boundary coverage rate and the cumulative weighted average coverage rate are calculated, and then the ore body is determined based on the boundary coverage rate and the cumulative weighted average coverage rate, as shown in FIG. 2.

A: in response to M1≤X<M2, C<$\overline{C}$, namely, the cumulative weighted average coverage rate is lower than the boundary coverage rate, thus an annual yield of ore body is lower than expected, there is no ore body is determined.

B: in response to M1≤X≤M2, C=$\overline{C}$, namely, the cumulative weighted average coverage rate is equal to the boundary coverage rate, thus the annual yield of ore body is equal to expected, there is an ore body is determined.

C: in response to M1≤X<M3, C>$\overline{C}$, namely, the cumulative weighted average coverage rate is higher than the boundary coverage rate, thus the annual yield of ore body is higher than expected, there is an ore body is determined.

D: in response to M1≤X≤M3, C=$\overline{C}$, namely, the cumulative weighted average coverage rate is equal to the boundary coverage rate, thus the annual yield of ore body is equal to expected, there is an ore body is determined.

E: in response to M1≤X≤M4, C<$\overline{C}$, namely, the cumulative weighted average coverage rate is lower than the boundary coverage rate, thus the annual yield of ore body is lower than expected, there is no ore body is determined.

In conclusion, the range of M1≤X≤M3 is delineated as a first ore body based on the comparison results.

Figure 3:
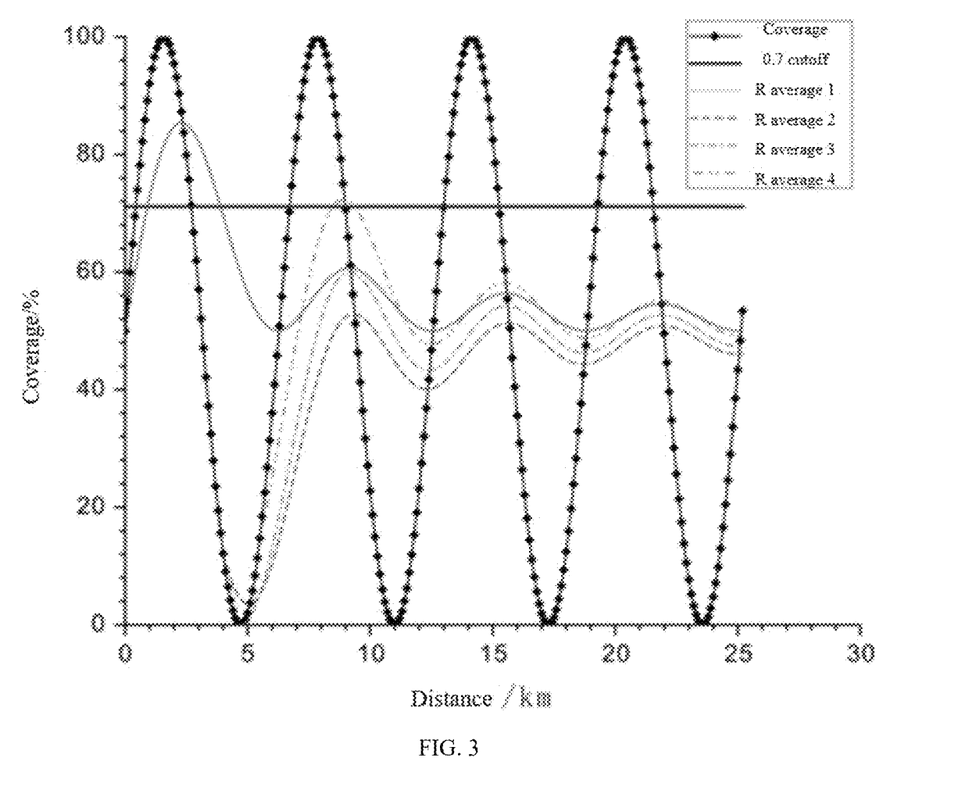
FIG. 3 illustrates a schematic diagram of a principle of multi-ore body delineation in the disclosure.

In the embodiment, the principle of delineating the boundary range of the n-th ore body is as follows.

In the embodiment, the principle of delineating the boundary range of the n-th ore body is based on the principle of delineating the boundary range of the first ore body. After completing the delineation of the first ore body, the starting point for the search is set to the endpoint of the first ore body added with a step length, and the calculating and the determining continues to be performed. If there is no ore body is determined, the step length continues to be added, and the calculating and the determining continues to be performed, and so on, until the range of a second ore body is determined. As shown in FIG. 3, the search method for delineating the boundary range of the n-th ore body is as follows.

A, the measured coverage rate ($C_i$), and its longitude and latitude ($lon_i$, $lat_i$);

B, the boundary coverage rate (cutoff) is calculated, as shown in FIG. 3 with an example of the cutoff=71%;

C, the cumulative weighted average coverage rate 1 (R average 1), the range between the starting point of R average 1 and a second intersection point of R average 1 and cutoff is designated as an ore body range 1;

D, the second intersection point of R average 1 and cutoff added with the step length is taken as the starting point, followed by calculating a R average 2;

E, if a maximum value of R average is less than the cutoff, the second intersection point of R average 1 and cutoff added with n step lengths is taken as the starting point, and followed by continuing to calculate the R average (such as R average 3);

F, When the maximum value of R average calculated starting from the second intersection point of R average 1 and cutoff added with n step lengths is greater than the cutoff (R average 4), the range between the starting point of R average 4 and the second intersection point of R average 4 and cutoff is designated as an ore body range 2;

G, the calculating is sequentially performed to progressively delineate an ore body range n by following the above steps.

Embodiment 2

Figure 4:
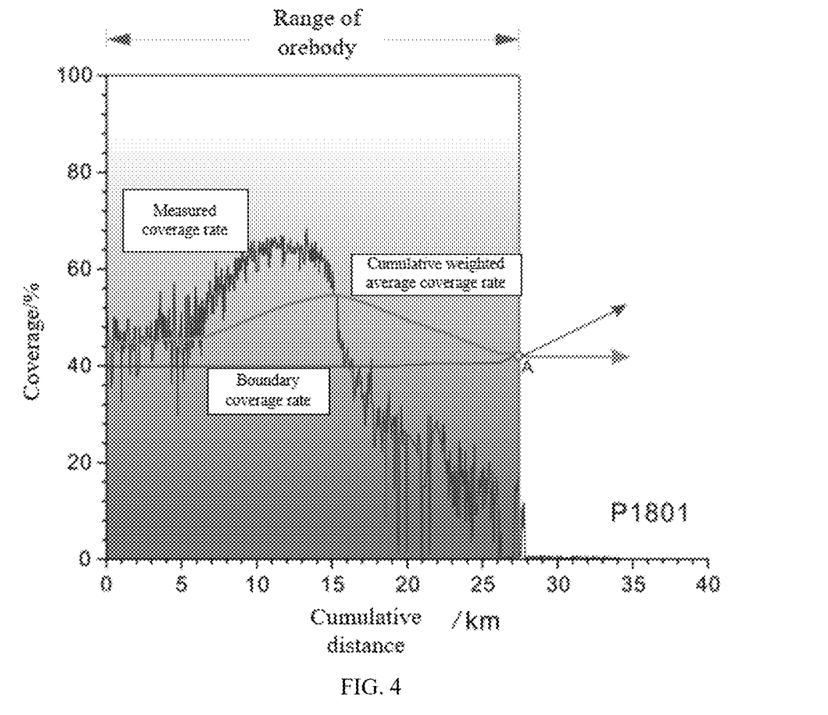
FIG. 4 illustrates a schematic diagram of delineating ore body range in the embodiment of the disclosure, taking nodule photographic coverage data of three lines in western Pacific as an example.

Following the method process of the embodiment 1, the embodiment 2 processes three sets of nodule photographic coverage data from the western Pacific to delineate the ore body ranges, as shown in FIG. 4. The specific steps are as follows.

A, the measured coverage rate of polymetallic nodules in a profile ($C_i$), their longitude and latitude ($lon_i$, $lat_i$) are obtained, and the spacing of adjacent two of the camera coverage data points (li) is calculated;

B, the boundary coverage rate ($\overline{C}$) is calculated;

C, the R average (the cumulative weighted average coverage rate C) of the measured coverage rate ($C_i$) is calculated;

D, an intersection point A between the R average of the measured coverage rate ($C_i$) and the boundary coverage rate ($\overline{C}$) is identified, as well as its corresponding coordinate position;

Between 0 meter (m) and 27529.77 m, since C≥$\overline{C}$, this range is determined to be the ore body range.

The results of this embodiment indicate that: A. The ore body in the range meets the production efficiency requirement of an annual output of 3 million tons of dry nodules. B. The ore body in the range satisfies the set technical indicators of the mining system, which specifically include: 1 mining machine, a collection head width of 6 meters, a collection surface overlap rate of 10%, a recovery of 85%, and a travel speed of 9 km/h. C. The ore body in the range contains a certain amount of blank areas (r<1), and the boundary coverage rate is not a fixed value, but increases as the proportion of the mineable area of the ore body (r) decreases.

Embodiment 3

A non-transitory computer-readable storage medium stored with computer program instructions is provided, the computer program instructions are configured, when being executed by a processor, to implement the method mentioned above.

The above are merely specific embodiments of the disclosure. However, the scope of protection of the disclosure is not limited to this. Any changes or substitutions that can be easily thought of by those skilled in the art within the technical scope disclosed by the disclosure should also be covered within the scope of protection of the disclosure. Therefore, the scope of protection of the disclosure should be subject to the scope of protection defined by the claims.

What is claimed is:

1. A method for delineating an ore body of deep-sea polymetallic nodules based on coverage data, comprising:
   obtaining ore body data of the deep-sea polymetallic nodules, wherein the ore body data comprises: mining site production scale parameters, mining system parameters, and ore body geological characteristic parameters;
   calculating, based on the mining site production scale parameters, the mining system parameters, and the ore body geological characteristic parameters, a boundary coverage rate and a cumulative weighted average coverage rate;
   delineating, based on the boundary coverage and the cumulative weighted average coverage, the ore body of the deep-sea polymetallic nodules through a principle of ore body boundary range delineation to obtain an ore body range; and
   planning an annual production of a nodule mine, constructing a mining system, based on the ore body range by delineating the ore body on ocean floor, and using mining machines, through the mining system, to collect nodules on deep-sea floor, thereby yielding production of nodules complying the planned annual production of the nodule mine;
   wherein the mining site production scale parameters comprise: an annual production of dry nodules, a water content of nodules, and production days per year;
   wherein the mining system parameters comprise: a quantity of the mining machines, a collection head width of each of the mining machines, a collection surface overlap, a width of collection operation surface of each of the mining machines, a daily operation distance of each of the mining machines, a recovery rate, a first travel speed of each of the mining machines during collection operation, a first total distance, a first duration, a second travel speed of each of the mining machines during no-load operation, a second total distance, and a second duration;
   wherein the ore body geological characteristic parameters comprise: longitudes and latitudes of camera coverage data points, a spacing of adjacent two of the camera coverage data points, a measured coverage, a proportion of mineable area of the ore body, a coverage of mining blank area, a prediction average abundance, and a water content of nodule;
   wherein a formula of the boundary coverage rate is expressed as follows:

$$\overline{C} = 2.9853 \cdot \frac{(V1 - V1 \cdot r + V2 \cdot r)}{24 \cdot V1 \cdot V2 \cdot r \cdot W' \cdot ol \cdot N \cdot R} \cdot \frac{T'}{(1-h) \cdot D}$$

where $$r = \frac{L_1}{L}, L_1 = \sum_{i=1}^{i=n} l_i, l_i = (l_{i-1} + l_{i+1})/2;$$

$l_i$ represents the spacing of adjacent two of the camera coverage data points; L represents the daily operation distance of each of the mining machines; $L_1$ represents the first total distance; V1 represents the first travel speed; V2 represents the second travel speed; r represents the proportion of the mineable area of the ore body; W' represents the width of the collection head of each of the mining machines; ol represents the collection surface overlap; N represents number of mining machines; R represents the recovery rate; T' represents the annual production of dry nodules; h represents the water content of nodules; $\overline{C}$ represents the boundary coverage rate; and D represents the production days per year;
wherein a formula of the cumulative weighted average coverage is expressed as follows:
the cumulative weighted average coverage rate C being calculated from $C_1, C_2, \ldots, C_n$, $$C_n = \frac{\sum_{i=1}^{n} l_i Cov_i}{\sum_{i=1}^{n} l_i}, \text{ and } Cov_i \geq C_0$$

where $l_i$ represents the spacing of adjacent two of the camera coverage data points; $Cov_i$ represents the measured coverage rate; $C_0$ represents a lower limit of mineable coverage rate of the mining system.

2. The method as claimed in claim 1, wherein the principle of ore body boundary range delineation comprises: a principle of single-ore body delineation and a principle of multi-ore body delineation.

3. The method as claimed in claim 2, comprising:
setting a starting point, and
comparing, based on the starting point, the boundary coverage rate with the cumulative weighted average coverage rate through the principle of single-ore body delineation to obtain comparison results, and determining the ore body range based on the comparison results.

4. The method as claimed in claim 3, wherein the determining the ore body range based on the comparison results comprises:
   in response to M1≤X<M2, C<$\overline{C}$, namely, the cumulative weighted average coverage rate being lower than the boundary coverage rate, thus an annual yield of ore body being lower than expected, determining there is no ore body, wherein M1 represents a search start point, M2 represents a first search end point, and X represents a search distance;
   in response to M1≤X≤M2, C=$\overline{C}$, namely, the cumulative weighted average coverage rate being equal to the boundary coverage rate, thus the annual yield of ore body being equal to expected, determining there is an ore body;
   in response to M1≤X<M3, C>$\overline{C}$, namely, the cumulative weighted average coverage rate being higher than the boundary coverage rate, thus the annual yield of ore body being higher than expected, determining there is an ore body, wherein M3 represents a second search end point;
   in response to M1≤X<M3, C=$\overline{C}$, namely, the cumulative weighted average coverage rate being equal to the boundary coverage rate, thus the annual yield of ore body being equal to expected, determining there is an ore body;

in response to M1≤X<M4, C<$\overline{C}$, namely, the cumulative weighted average coverage rate being lower than the boundary coverage rate, thus the annual yield of ore body being lower than expected, determining there is no ore body, wherein M4 represents a third search end point;

delineating, based on the comparison results, the range of M1≤X<M3 as an ore body 1.

5. The method as claimed in claim 4, wherein, based on the principle of multi-ore body delineation, adding a step length on an endpoint of a single-ore body range as a starting point, continuing the calculating and the determining;

in response to no ore body being identified, continuing adding with the step length, and followed by continuing the calculating and the determining, until a range of an ore body 2 is identified.

6. A non-transitory computer-readable storage medium stored with computer program instructions, wherein the computer program instructions are configured, when being executed by a processor, to implement the method as claimed in claim 1.

7. A method for delineating an ore body of deep-sea polymetallic nodules based on coverage data, comprising:

obtaining ore body data of the deep-sea polymetallic nodules, wherein the ore body data comprises: mining site production scale parameters, mining system parameters, and ore body geological characteristic parameters;

calculating, based on the mining site production scale parameters, the mining system parameters, and the ore body geological characteristic parameters, a boundary coverage rate and a cumulative weighted average coverage rate;

delineating, based on the boundary coverage and the cumulative weighted average coverage, the ore body of the deep-sea polymetallic nodules through a principle of ore body boundary range delineation to obtain an ore body range; and mining, by mining machines, the ore body of the deep-sea polymetallic nodules in the ore body range to obtain the deep-sea polymetallic nodules;

wherein the mining site production scale parameters comprise: an annual production of dry nodules, a water content of nodules, and production days per year;

wherein the mining system parameters comprise: a quantity of the mining machines, a collection head width of each of the mining machines, a collection surface overlap, a width of collection operation surface of each of the mining machines, a daily operation distance of each of the mining machines, a recovery rate, a first travel speed of each of the mining machines during collection operation, a first total distance, a first duration, a second travel speed of each of the mining machines during no-load operation, a second total distance, and a second duration;

wherein the ore body geological characteristic parameters comprise: longitudes and latitudes of camera coverage data points, a spacing of adjacent two of the camera coverage data points, a measured coverage, a proportion of mineable area of the ore body, a coverage of mining blank area, a prediction average abundance, and a water content of nodule;

wherein a formula of the boundary coverage rate is expressed as follows:

$$\overline{C} = 2.9853 \cdot \frac{(V1 - V1 \cdot r + V2 \cdot r)}{24 \cdot V1 \cdot V2 \cdot r \cdot W' \cdot ol \cdot N \cdot R} \cdot \frac{T'}{(1-h) \cdot D}$$

where $$r = \frac{L_1}{L}, L_1 = \sum_{i=1}^{i=n} l_i, l_i = (l_{i-1} + l_{i+1})/2;$$

$l_i$ represents the spacing of adjacent two of the camera coverage data points; L represents the daily operation distance of each of the mining machines; $L_1$ represents the first total distance; V1 represents the first travel speed; V2 represents the second travel speed; r represents the proportion of the mineable area of the ore body; W' represents the width of the collection head of each of the mining machines; ol represents the collection surface overlap; N represents number of mining machines; R represents the recovery rate; T' represents the annual production of dry nodules; h represents the water content of nodules; $\overline{C}$ represents the boundary coverage rate; and D represents the production days per year;

wherein a formula of the cumulative weighted average coverage is expressed as follows:

the cumulative weighted average coverage rate C being calculated from $C_1, C_2, \ldots, C_n$, $$C_n = \frac{\sum_{i=1}^{n} l_i Cov_i}{\sum_{i=1}^{n} l_i}, \text{ and } Cov_i \geq C_0$$

where $l_i$ represents the spacing of adjacent two of the camera coverage data points; $Cov_i$ represents the measured coverage rate; $C_0$ represents a lower limit of mineable coverage rate of the mining system.

* * * * *